United States Patent
Wilks et al.

(10) Patent No.: US 6,651,519 B2
(45) Date of Patent: Nov. 25, 2003

(54) DEVICE FOR MEASURING TORQUE IN A DRIVE ASSEMBLY

(75) Inventors: Eberhard Wilks, Daufenbach (DE); Andreas Lohmuller, Bonn (DE)

(73) Assignee: GKN Walterscheid GmbH (DE)

( * ) Notice: Subject to any disclaimer, the term of this patent is extended or adjusted under 35 U.S.C. 154(b) by 0 days.

(21) Appl. No.: 10/045,910

(22) Filed: Oct. 19, 2001

(65) Prior Publication Data

US 2002/0117011 A1 Aug. 29, 2002

(30) Foreign Application Priority Data

Oct. 19, 2000 (DE) .......................................... 100 52 069

(51) Int. Cl.$^7$ ................................................ G01L 3/02
(52) U.S. Cl. ........................ 73/862.191; 73/862.08; 73/862.328
(58) Field of Search .................. 73/862, 862.08, 73/862.191, 862.328, 862.329, 862.324, 862.325, 862.326, 862.28, 862.29, 862.334

(56) References Cited

U.S. PATENT DOCUMENTS

| | | |
|---|---|---|
| 4,432,245 A | 2/1984 | Hattori et al. |
| 4,488,443 A | 12/1984 | Parkinson |
| 4,590,806 A | 5/1986 | Lutton et al. |
| 4,602,515 A | 7/1986 | Eichenlaub |
| 4,787,255 A | 11/1988 | Guay |
| 4,899,596 A | 2/1990 | Janik et al. |
| 5,062,062 A * | 10/1991 | Nishibe et al. ................ 702/41 |
| 5,228,349 A | 7/1993 | Gee et al. |
| 5,285,691 A * | 2/1994 | Baer ...................... 73/862.325 |
| 5,301,559 A * | 4/1994 | Tsuji et al. ............. 73/862.326 |
| 5,408,887 A | 4/1995 | Roth et al. |
| 5,596,153 A * | 1/1997 | Bulgrien et al. ........ 73/862.326 |
| 5,672,834 A * | 9/1997 | Searle et al. ........... 73/862.338 |
| 5,675,095 A * | 10/1997 | Ballantyne ............. 73/862.325 |
| 5,874,682 A * | 2/1999 | Schafer et al. .......... 73/862.338 |
| 5,890,992 A * | 4/1999 | Salecker et al. .............. 477/86 |
| 6,386,351 B1 * | 5/2002 | Salecker et al. ........... 192/54.1 |

FOREIGN PATENT DOCUMENTS

| | | |
|---|---|---|
| DE | 24 35 286 | 2/1975 |
| DE | 26 58 697 | 9/1979 |
| DE | 36 27 739 | 1/1989 |
| DE | 38 44 578 | 4/1993 |
| DE | 42 31 412 A1 | 3/1994 |
| DE | 42 32 994 | 4/1994 |
| DE | 196 33 380 | 3/1997 |
| DE | 198 16 831 | 10/1999 |
| EP | 0 284 508 | 9/1989 |
| GB | 1 465 734 | 3/1977 |

* cited by examiner

Primary Examiner—Edward Lefkowitz
Assistant Examiner—Andre Allen
(74) Attorney, Agent, or Firm—Harness, Dickey & Pierce, P.L.C.

(57) ABSTRACT

A device for measuring torque in a drive assembly includes a torque-loaded torsion element (9), such as a shaft, and a reference element (21) surrounding the torsion element (9). The reference element is correspondingly tubular in shape. A first tube end (22) of the reference element (21) is firmly connected to a first shaft end (10) of the torsion element (9). A second tube end (24) of the reference element (21) is supported on the second shaft end (11) of the torsion element (9). The two tube ends (22, 24) are each associated with a transmitter element (16, 34). The relative position of the transmitter elements (16, 34) in the direction of rotation around the rotational axis (8) is recorded by a sensor element (35). The sensor (35) is associated with a housing (1). The sensor (35) generates a signal each time the two transmitter elements (16, 34) pass and transmits signals to an evaluation unit (36). The evaluation unit (36) determines the torque applied from the offset of the signals.

7 Claims, 2 Drawing Sheets

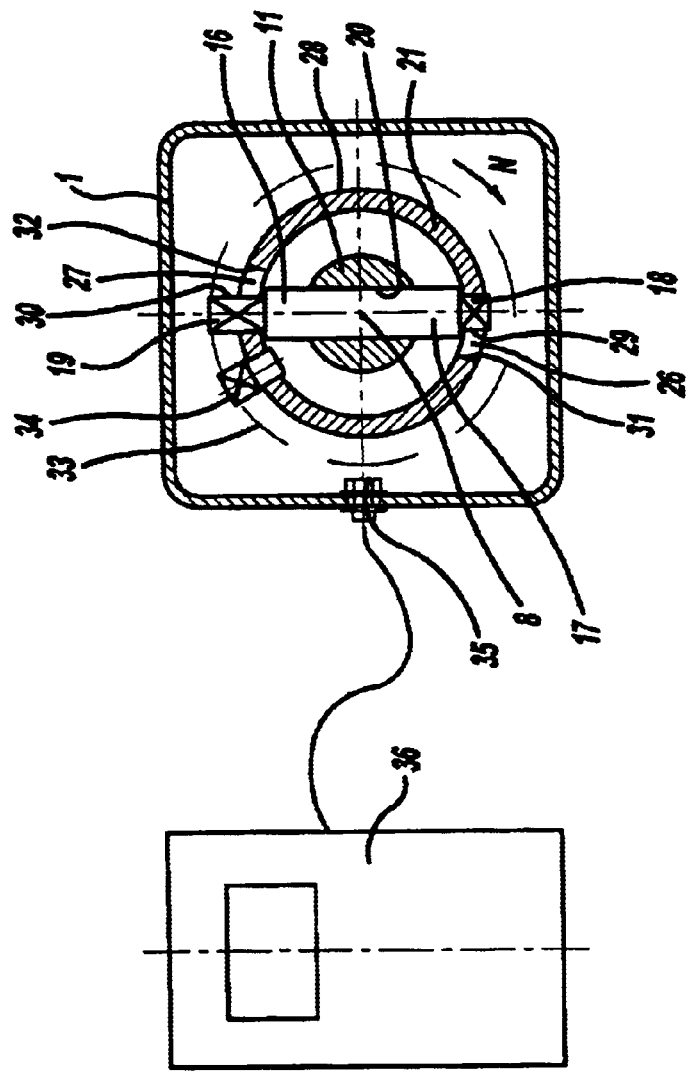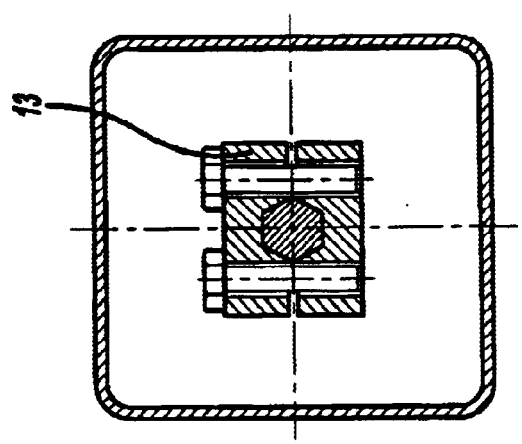

DEVICE FOR MEASURING TORQUE IN A DRIVE ASSEMBLY

CROSS-REFERENCE TO RELATED APPLICATIONS

This application claims priority to German Patent Application No. 100 52 069.3 filed Oct. 19, 2000, which application is herein expressly incorporated by reference.

FIELD AND BACKGROUND OF THE INVENTION

The present invention relates to a device for measuring torque in a drive assembly.

In order to measure torque at a rotating component, for instance at a torque-loaded driveshaft in a gearbox, preferably strain gauges are applied to the driveshaft. The electric signals generated by the gauges are transmitted by slip ring transmitters to the outside. In such devices, it is possible to generate high-precision torque signals like those required for measuring devices used in laboratories. The signals can also be transmitted in a contact-free way by transmitters and receivers. To provide measuring bridges from strain gauges, to calibrate the gauges and to connect the necessary cables, generates high costs. Also, there is a considerable cost to transmit the signals from the rotating shaft to the stationary components. Furthermore, the error quota is very high as a result of the high degree of integration of electronic components in gearboxes. For many facilities and machines, such a high degree of accuracy of measuring devices is not required. However, the above-mentioned devices cannot be de-refined to provide adequate cost savings. This is the reason why, in spite of the high degree of benefit derived from torque measurements for the respective operating process, such devices are practically never used in drive systems for agricultural machinery. One example of integrating such a device is a gearbox, which is disclosed in DE 42 31 412 C1.

SUMMARY OF THE INVENTION

It is an object of the invention to propose a device for measuring torque in a drive assembly. The device has a simple design and is inexpensive. The device does not require electric signals to be transmitted from a rotating component to a stationary receiver.

In accordance with the invention, the device for measuring torque in a drive assembly, comprises a torsion element. The torsion element is rotatingly drivable around a rotation axis in order to transmit torque. Also, the torsion element can be torque loaded.

A reference element rotates with the torsion element. The reference element is torque-free for the torque range to be measured. A first transmitter element is attached to the torsion element. The first transmitter is moved on a rotational circle when the torsion element rotates. A second transmitter element is attached to the reference element. The second transmitter is movable on the rotational circle so as to be circumferentially offset relative to the first transmitter element. A sensor element is stationary relative to the torsion element and the reference element. The sensor element is positioned opposite the rotational circle of the two transmitter elements. The sensor element records the passage of the transmitter elements or reference edges or reference faces of the transmitter elements and generates a corresponding signal. An evaluation unit receives the signals. The evaluation unit determines the respective torque value from an offset of the signals. The reference element participates in the transmission of torque once a predetermined torque value has been reached.

An advantage of this design is that the relative position of the two transmitter elements relative to one another, i.e. the size of the offset between said two elements on the rotational circle, contains information on the value of the torque applied. This information can be derived from signals generated by two transmitter elements when passing the stationary sensor. The sequence of the signals in terms of time, their relative displacement in terms of time, is proportional to the torque applied. The signals can be converted in an evaluation unit into measured torque values. The torque values may be used to generate either a warning signal or an indication or they can be used for controlling the drive. For instance, under certain circumstances, a driven unit may be stopped. On the other hand, depending on the torque value identified, a function of the device such as a higher or lower rotational speed of the driveline provided with the torque measuring device may be controlled. But other functions can also be influenced. Examples for the application of such a torque measuring device are spreading devices for artificial fertilizer or dung. For example, if the torque has dropped to a minimum value in a spreader of artificial fertilizer, this may indicate that the storage container is empty or that the spreading device is no longer adequately supplied with artificial fertilizer. Too high a torque value, a value reaching its maximum, may be an indication of blockages. The participation in the transmission of torque on the part of the reference element from a certain torque value onwards is particularly advantageous if the inventive device is used in agricultural implements. One example is to free an implement when blockages occur. The load is higher than under normal operating conditions. This means that the torque measuring device can be designed such that measurements are only taken within the actual operating range.

In the case of a dung spreading implement, the torque measuring device can be incorporated into the driveline of the working tools which spread the dung onto the field. Also, depending on the measured torque value, it is possible to control the scraper base in order to supply the ejection elements with more or less dung to provide a uniform distribution.

To improve the solution in accordance with the invention, the torsion element includes a torque shaft. The torque shaft includes a first shaft end and a second shaft end. The reference element includes a tube with a first tube end and a second tube end. The reference element is arranged co-axially around the torsion element. The first tube end is firmly connected to the first shaft end. The second transmitter element is arranged at an outer circumference of the second tube end. The second tube end has a recess to enable passage of the first transmitter element attached to the torsional element. Both transmitter elements are arranged in a common plane on the common rotational circle. Thus, this provides a particularly simple design.

According to a further embodiment, a first recess is provided in the second tube end of the reference element which enhances the ability of the reference element to participate in the transmission of torque when a predetermined torque value has been reached. A second recess is diametrically opposed relative to the first recess. Both recesses are each delimited in the circumferential direction by spaced planar stop faces. The first transmitter element is journal-shaped and attached to the torsion element. The first transmitter extends transversely to the rotational axis. The first transmitter, via a first projection, extends radially into the first recess. Further, the first transmitter, via a second projection, projects radially from the second recess. The projecting portion of the first transmitter serves as a transmitter portion. To keep the load low, the two projections are provided with flattened portions. The flattened portions are intended to come to rest against the stop faces of the reference element.

In a preferred embodiment, the second transmitter element includes a journal element. The journal element is arranged on an outer face of the reference element. Thus, the journal element is circumferentially offset relative to the second recess where the second projection emerges. The journal element serves as the second transmitter element. The journal element, with respect of its shape, is preferably designed to correspond to the second projection which serves as the first transmitter element.

The sensor element is associated with a stationary housing. The housing encloses the torsion element and the reference element in the region of the two transmitter elements. The evaluation unit can be arranged, for example, in a region which is visible or noticeable by the tractor driver. Alternatively, it is possible for the evaluation unit to be arranged near the sensor. Accordingly, the signals are transmitted to an indicator or signal unit attached in a region where the tractor driver can see or hear the indicator.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment of the invention is explained in greater detail with reference to a drive assembly for an agricultural implement, wherein:

FIG. 2 is a section view along line II—II of FIG. 1.

FIG. 3 is a section view of along line III—III of FIG. 1 also coupled with an evaluation unit.

DETAILED DESCRIPTION OF THE PREFERRED EMBODIMENTS

Figure 1:
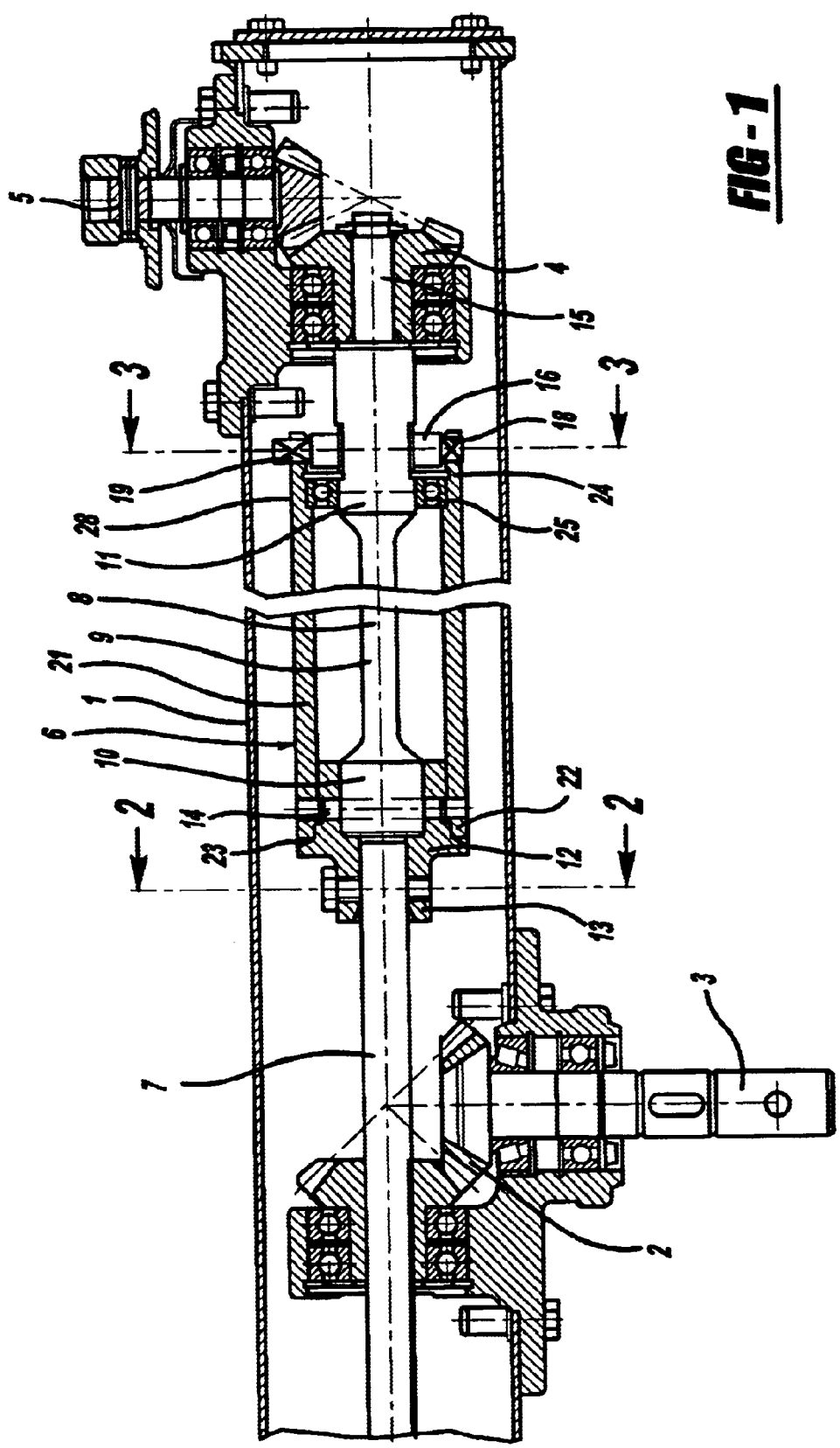
FIG. 1 is a longitudinal section view of a drive assembly portion with a torque measuring device in accordance with the invention.

Turning to the figures, particularly FIG. 1, a portion of a drive assembly for an agricultural implement is shown. A housing 1 or a box-shaped carrying frame is associated with a first bevel gear angle drive. An outwardly projecting input journal 3 of the angle drive 2 introduces torque into the assembly. The first bevel gear angle drive 2 is connected to a second bevel gear angle drive 4 via a torque measuring device 6 and a driveshaft 7. The torque measuring device 6 and driveshaft 7 are jointly rotatable around a rotational axis 8. At a distance from the second bevel gear angle drive 4, it is associated with the housing 1 and includes an output journal 5.

A torque introduced via the input journal 3 is transmitted, via the assembly, to the output journal 5. The driveshaft 7 also establishes a torque connection with one or several further bevel gear angle drives with corresponding output journals. Accordingly, one or several torque measuring devices, designed in accordance with the torque measuring device 6 as described below, can be incorporated into the driveline leading to further driven portions.

The torque measuring device 6 includes a torsion element 9 in the form of a shaft. The shaft's cross-section is calculated for the torque range required under normal operating conditions. Furthermore, the torsion element 9 includes a first shaft end 10 and a second shaft end 11. The thickness of the shaft ends 10, 11 increases relative to the region therebetween which is twisted when subjected to torque.

The first shaft end 10 is connected to the attaching element 12 by a cylindrical pin 14. The attaching element 12 includes a clamping portion 13 which establishes a connection with the driveshaft 7. The first shaft end 10 is rotationally connected to the driveshaft 7. Thus, when the driveshaft 7 is driven, the first shaft end 10 rotates with the driveshaft 7.

The second shaft end 11 has a connecting journal 15. The connecting journal 15 establishes a rotationally fast connection with a bevel gear of the second bevel gear angle drive 4. The second shaft end 11 includes a transverse bore 20. The bore axis intersects the rotational axis 8 at a right angle.

A first transmitter element 16, formed as a journal, is firmly inserted into the transverse bore 20 by means of its cylindrical connecting portion 17. The first transmitter element 16 includes a first projection 18. A second projection 19 is at its other end diametrically relative to the first projection 18.

A tubular reference element 21 is arranged around the torsion element 9. A first tube end 22 of the tubular reference element 21 is firmly connected to the attaching element 12 by a weld 23. In consequence, the first tube end 22 is also firmly connected to the first shaft end 10 of the torsion element 9. Thus, the first tube end 22 follows the rotational movement of the torsion element 9. A rolling contact bearing 25 on the second shaft end 11 supports a region of its second tube end 24. The second tube end 24 thus follows the first tube end 22. Accordingly, the second tube end 24 is not deformed in the region measured. Thus, a reference point at the second shaft end 11 either moves ahead of or follows a reference point arranged in a torque-free condition at the first shaft end 10 as a function of the torque applied to the torsion element 9. The first tube end 24 is provided with two diametrically arranged recesses. The first recess 26 and the second recess 27 extend in a circumferential direction across the tube to a limited region. The two recesses 26, 27 are identical.

The first projection 18 extends into the first recess 26. The first projection 18 is flush with the outer face 28 of the tubular reference element 21. The second projection 19 extends through the second recess 27. A certain amount of the second projection projects from the outer face 28 of the tubular reference element 21. The circumferential extension of the two recesses 26, 27 exceeds that of the two projections 18, 19 by a certain amount. Accordingly, when the torsion element 9 is torque-loaded, the two projections 18, 19, within the limits of their degree of freedom, are able to move freely in the recesses 26, 27. The two projections 18, 19, move until, via their flattened portions 29, 20, they come to rest against the respective stop faces 31, 32 and a predetermined maximum torque has been reached. Thereafter, the reference element 21 also participates in the transmission of torque from the first bevel gear angle drive 2 to the second bevel gear angle drive 4.

The portion of the second projection 19, which projects beyond the outer face 28 of the tubular reference element 21, serves as a transmitter portion. Thus, the second projection 19 practically takes on the function of a transmitter element. When it rotates, the second projection portion is centered on the rotational circle 33. A second transmitter element 34 projects from the outer face 28 of the tubular reference element 21. The second transmitter element is circumferentially offset relative to the second recess 27. The second transmitter element 34, with respect to shape, is adapted to the second projection 19 or to the portion of the second projection 19. The second transmitter element 34 is arranged on the same rotational circle as the second projection 19. When torque is applied in the rotational direction N, the second projection 19 of the transmitter element 16 moves ahead of the second transmitter element 34. The amount of the lead is recorded by a sensor 35. The sensor 35 is arranged opposite the rotational circle 33 and thus opposite the two transmitter elements 16, 34.

The sensor element 35 is connected to an evaluation unit 36. The evaluation unit 36 calculates the applied torque from the following sequence. From the offset, in terms of time, of the passage of the first transmitter element 16 leading in the rotational direction N relative to the second transmitter element 34 which follows the first. The torque is proportional to the distance between the two transmitter elements 16, 34, respectively, of the second projection 19 of the first transmitter element, and the second transmitter element 34.

The evaluation unit 36 can generate an acoustic signal or release switching sequences. For example, the evaluation unit can stop the drive. However, the evaluation unit may also be used to indicate the torque applied or provide an acoustic warning. The use of the inventive device is not limited to the above-described drive assembly. In addition to being used in drives for agricultural implements and machinery, the invention may be incorporated into a driveline of a bicycle.

While the above detailed description describes the preferred embodiment of the present invention, the invention is susceptible to modification, variation and alteration without deviating from the scope and fair meaning of the subjoined claims.

What is claimed is:

1. A device for measuring torque in a drive assembly, comprising:

a torsion element rotatingly drivable around a rotational axis, said torsion element being for transmitting torque;

a reference element rotates with the torsion element, the reference element is torque-free for the torque range to be measured;

a first transmitter element attached to the torsion element, said first transmitter element being moved along a rotational circle when the torsion element rotates;

a second transmitter element attached to the reference element, said second transmitter element being movable along the rotational circle and being circumferentially offset relative to the first transmitter element;

a sensor element stationarily positioned relative to the torsion element and the reference element, said sensor element being positioned opposite the rotational circle of the two transmitter elements, said sensor records the passage of the transmitter elements or of reference edges or reference faces of said transmitter element and generates a corresponding signal; and an evaluation unit, said evaluation unit receives the signals and determines the respective torque value from the offset of the signals, wherein the reference element participates in the transmission of torque once a predetermined torque value which exceeds the torque range to be measured has been reached.

2. The device according to claim 1, wherein the torsion element includes a torque shaft comprising a first shaft end and a second shaft end, said reference element includes a tube comprising a first tube end and a second tube end, said reference element arranged co-axially around the torsion element, said first tube end being firmly connected to the first shaft end, said second transmitter element being arranged on the outer circumference of the second tube end and the second tube end comprises a recess to enable passage of the first transmitter element attached to the torsion element, wherein both transmitter elements are arranged in a common plane on the rotational circle.

3. The device according to claim 2, wherein a first recess is provided at the second tube end of the reference element and a second recess is positioned diametrically opposite said first recess, planar stop faces delimit each recess in the circumferential direction, and said first transmitter element is journal-shaped and attached to the torsion element extending transversely to the rotational axis and a first projection of the transmitter element extends radially into the first recess and a second projection of the transmitter element projects radially from the second recess wherein the projecting portion of the transmitter element serves as a transmitter portion.

4. The device according to claim 3, wherein the two projections comprise flattened portions which are intended to come to rest against the stop faces.

5. The device according to claim 3, wherein the second transmitter element includes a journal element which is arranged on the outer face of the reference element circumferentially offset relative to the second recess from where the second projection emerges.

6. The device according to claim 5, wherein the journal element serving as the second transmitter element, with respect of shape, corresponds to the associated projection serving as the first transmitter element.

7. The device according to claim 1, wherein the sensor is associated with a housing which encloses the torsion element and the reference element in the region of the two transmitter elements.

* * * * *